(12) United States Patent
King et al.

(10) Patent No.: US 9,530,114 B2
(45) Date of Patent: *Dec. 27, 2016

(54) METHOD AND APPARATUS FOR OPERATING, INTERFACING AND/OR MANAGING FOR AT LEAST ONE OPTICAL CHARACTERISTIC SYSTEM FOR CONTAINER HANDLERS IN A CONTAINER YARD

(71) Applicant: HKI Systems and Service, LLC., Hayward, CA (US)

(72) Inventors: Henry King, Moraga, CA (US); Toru Takehara, Tokyo (JP)

(73) Assignee: HKI Systems and Service, LLC, Moraga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,667

(22) Filed: Jul. 16, 2013

(65) Prior Publication Data

US 2014/0147045 A1    May 29, 2014

Related U.S. Application Data

(63) Continuation of application No. 12/262,125, filed on Oct. 30, 2008, now Pat. No. 8,488,884.

(Continued)

(51) Int. Cl.
*G06K 9/18* (2006.01)
*G06Q 10/08* (2012.01)
(Continued)

(52) U.S. Cl.
CPC ............. *G06Q 10/087* (2013.01); *B65G 1/137* (2013.01); *B66F 9/0755* (2013.01); *B66F 9/186* (2013.01);
(Continued)

(58) Field of Classification Search
CPC ............................ B65G 63/004; B66F 9/0755
(Continued)

(56) References Cited

U.S. PATENT DOCUMENTS 7,769,221 B1 *  8/2010  Shakes et al. ................ 382/141
7,813,540 B1 * 10/2010  Kraft ............................ 382/143
(Continued)

*Primary Examiner* — Gregory M Desire
(74) *Attorney, Agent, or Firm* — GSS Law Group

(57) ABSTRACT

Methods and several apparatus embodiments are disclosed operating Optical Characteristic Systems (OCS) in a container storage and/or transfer yard supporting the automated recognition of container codes displayed on various sides of the containers being stored and/or transferred. At least one processor may initiate an operational process by an OCS mounted on a container handler to create an operational result, select the operational process based upon an operational schedule and communicate with at least one OCS to receive an image of a container being handled by the container handler to at least partly create a container code estimate for a container inventory management system. A program system directing at least one computer implementing these operations, and may reside in computer readable memory, an installation package and/or a download server. The computer readable memory may or may not be accessibly coupled to the computer.

8 Claims, 6 Drawing Sheets

Related U.S. Application Data

(60) Provisional application No. 60/983,888, filed on Oct. 30, 2007.

(51) Int. Cl.
    *B66F 9/075*     (2006.01)
    *B66F 9/18*     (2006.01)
    *B65G 1/137*     (2006.01)
    *B65G 63/00*     (2006.01)

(52) U.S. Cl.
    CPC ............. *G06Q 10/08* (2013.01); *B65G 63/004* (2013.01); *B65G 2203/041* (2013.01)

(58) Field of Classification Search
    USPC .................................. 382/141, 143, 153, 181
    See application file for complete search history.

(56) References Cited

U.S. PATENT DOCUMENTS

| | | | |
|---|---|---|---|
| 7,957,580 B2* | 6/2011 | Ban et al. ...................... | 382/153 |
| 8,488,884 B2* | 7/2013 | King ................... | B66F 9/0755 |
| | | | 215/395 |
| 2006/0251498 A1* | 11/2006 | Buzzoni ............... | B65G 63/004 |
| | | | 414/139.9 |

\* cited by examiner

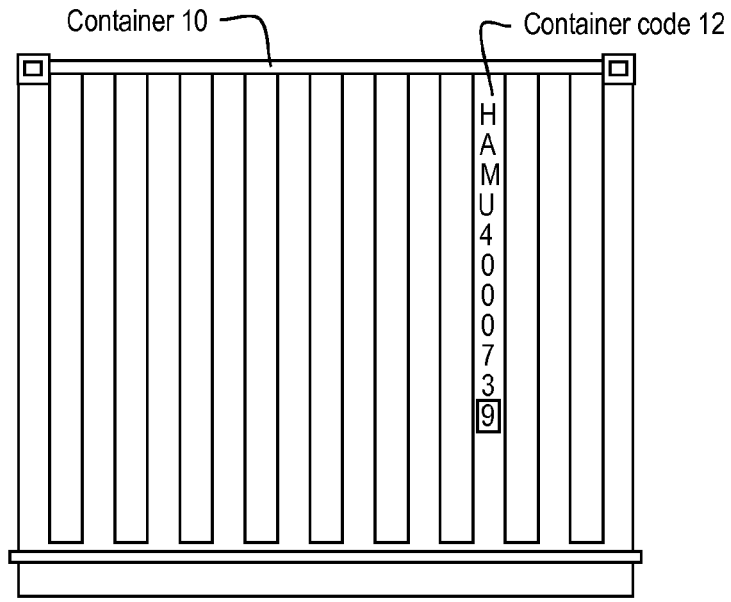
Fig. 10A
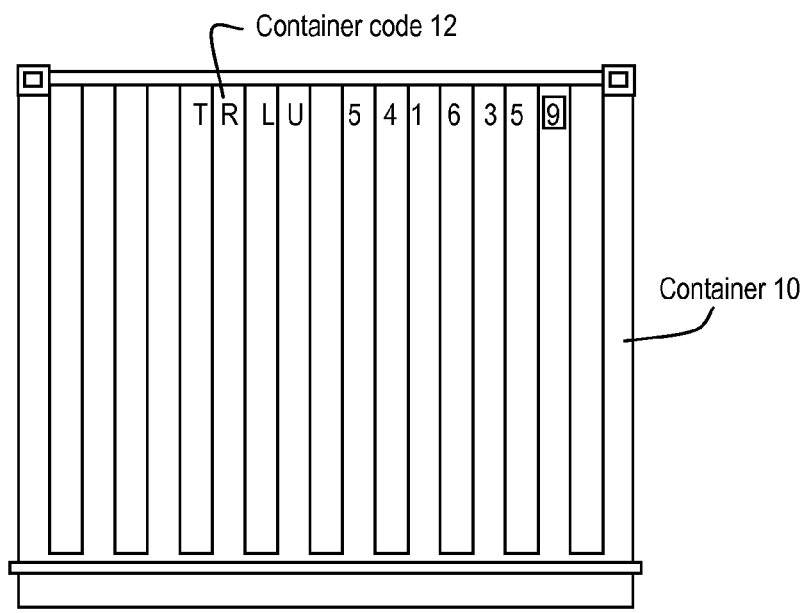
Fig. 10B
Fig. 10C

METHOD AND APPARATUS FOR OPERATING, INTERFACING AND/OR MANAGING FOR AT LEAST ONE OPTICAL CHARACTERISTIC SYSTEM FOR CONTAINER HANDLERS IN A CONTAINER YARD

CROSS REFERENCE TO RELATED APPLICATIONS

This application is a continuation application of U.S. patent application Ser. No. 12/262,125, filed Oct. 30, 2008, now issued U.S. Pat. No. 8,488,884, which claims priority to U.S. Provisional Patent Application No. 60/983,888 filed Oct. 30, 2007. The entire contents of these applications are hereby incorporated by reference.

TECHNICAL FIELD

This invention relates to operating at least one camera to create an image of a container by an apparatus on a container handler for use in estimating the container's code.

BACKGROUND OF THE INVENTION

Optical characteristic systems are used in container shipping and storage yards, but have had some problems. Frequently the optical characteristic system is mounted on a container handler and reports an estimate of the container code of a container being handled by the container handler, along with at least one container image of the container code.

One problem involves operational management of multiple instances of these systems. The operational management issues include but are not limited to power cycling the installed optical characteristic systems in time for shifts when they are to be operated, ensuring the regular running of diagnostics to determine if a unit is able to work the shift, notification of the need for maintenance or the ability of the unit for working the shift. What is needed is an economical approach for performing these operations on a container handler equipped with an optical characteristic system. This includes coordinating the diagnostic procedures, handling exceptions (such as poorly readable container numbers), developing and updating equipment schedules for the container yard or shipping terminal based upon the diagnostic results and shift schedule. Also needed, mechanisms and method of interfacing multiple instances of the optical characteristic systems to a container inventory management system, with or without the other needs being discussed.

SUMMARY OF THE INVENTION

The invention operates optical characteristic systems in a container storage and/or transfer yard, which may service container ships, railroads, overland trucks, factories and/or warehouses supporting the automated recognizing of container codes displayed on various sides of the containers being stored and/or transferred. At least one processor may initiate an operational process by an optical characteristic system mounted on a container handler to create an operational result, select the operational process based upon an operational schedule and communicate with at least one of the optical characteristic systems to receive at least one image of a container being handled by the container handler to at least partly create a container code estimate for transmission to a container inventory management system. These operations may further be implemented at separate embodiments of apparatus as follows:

A first embodiment may include a control module configured to initiate an operational process by at least one optical characteristic system configured to mount on at least one container handler to create an operational result. At least one example of this embodiment is also referred to in the incorporated provisional patent application as the Supervisory & Remote Diagnostic System (SRDS) control module. The SRDS control module refers to a system that monitors the overall health of the optical characteristic system 50. If the optical characteristic system fails, the SRDS system can still alert other systems of this failure as it runs independently from the optical characteristic system.

A second embodiment may include a management circuit configured to select said operational process for said optical characteristic system based upon an operational schedule or in a standalone mode in which the optical characteristic is generated anytime a container is moved by the container handler. The standalone mode will be referred to as having an operational schedule of just one operational event hereafter. The management circuit may further assemble the operational results to create a status report and/or access the status report to update the operational schedule.

A third embodiment may include a server interface configured to communicate with at least one of said optical characteristic systems to receive a version of an image of a container being handled by said container handler to at least partly create a container code estimate of a container code on said container for transmission to a container inventory management system. The system may also use imaging hardware to capture and generate an optical characteristic of the chassis, railcar, or bomb cart identifier which the container is being carried on, as it is being serviced by the container handler.

A program system for directing at least one computer may implement these operations, and may reside in a computer readable memory, an installation package and/or a download server. The computer readable memory may or may not be accessibly coupled to the computer.

BRIEF DESCRIPTION OF THE DRAWINGS

FIGS. 10A and 10B show some images of the container code as displayed on various sides of the container.

And FIG. 10C shows a container code estimate derived from one of these images.

DETAILED DESCRIPTION

Figure 1:
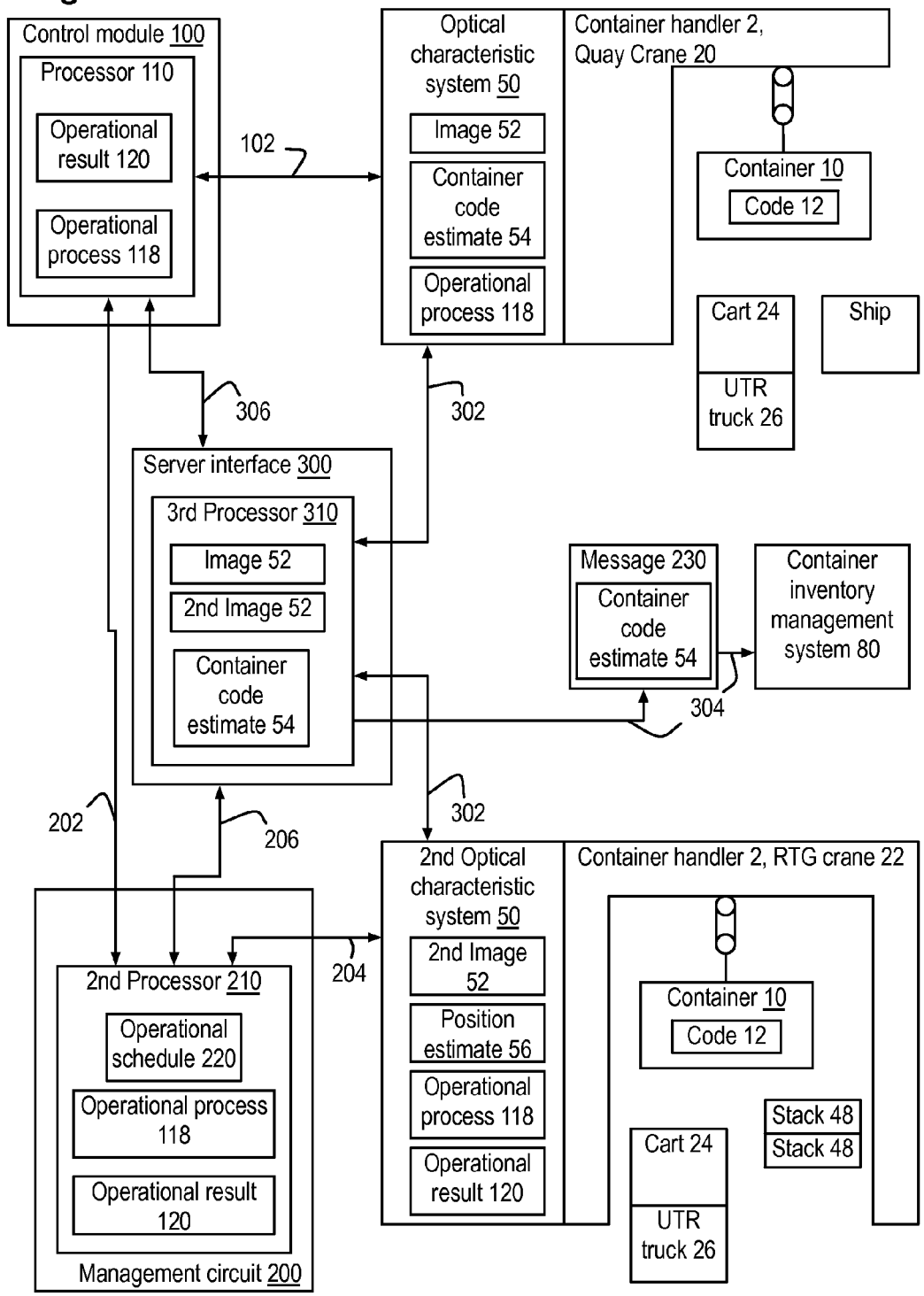
FIG. 1 shows an example of all three embodiments of the apparatus in operation in a yard storing and/or transferring containers with each of the containers including a container code. The three embodiments include a control module communicating with an optical characteristic system to initiate an operational process to create an operational result, a management circuit selecting the operational process based upon an operational schedule, and a server interface communicating with at least one, and preferably, at least two optical characteristic system to receive at least a version of an image of a container being handled by the container handler upon which the optical characteristic system is mounted. The server interface transmits a container code estimate of the container code of the container to a container inventory management system for the yard.

The invention operates optical characteristic systems 50 in a container storage and/or transfer yard, which may service container ships, railroads, truck routes, factories and/or warehouses in support of recognizing container codes 12 displayed on various sides of the containers 10 being stored and/or transferred. At least one processor may initiate an operational process by the optical characteristic system mounted on a container handler 2 to create an operational result 120, select the operational process based upon an operational schedule 220, and communicate with at least one of the optical characteristic systems to receive at least one image 60 of a container being handled by the container handler to at least partly create a container code estimate 62 for transmission to a container inventory management system 80.

FIG. 1 shows an example of all three embodiments of the apparatus in operation in a yard storing and/or transferring containers 10 with each of the containers including a container code 12. The three embodiments include a control module 100 communicating with an optical characteristic system 50 to initiate an operational process 118 to create an operational result 120, a management circuit 200 selecting the operational process based upon an operational schedule 220, and a server interface 300 communicating with at least one, and preferably, at least two optical characteristic systems 50 to receive at least a version of an image 50 of a container being handled by the container handler 2 upon which the optical characteristic system is mounted. The server interface transmits a container code estimate 54 of the container code of the container to a container inventory management system 80 for the yard. A container code may be read by the optical characteristic system 50 anytime a container is moved in the terminal by container handler 2 in which an optical characteristic system 50 installed even without a preplanned operational schedule for the particular container handler.

While a single processor may implement some or all of the operations of the invention, in certain embodiments separate processor may be included in each of these embodiments. The control module 100 may use a first processor 110 to initiate the operational process 118 and/or receive the operational result 120. The management circuit 200 may use a second processor 210 to select the operational process. And the server interface 300 may use a third processor 310 to communicate 302 with the optical characteristic systems 50 and/or communicate 304 with the container inventory management system 80.

The control module 100 may be communicatively coupled 102 with the optical characteristic system 50 mounted on the container handler 2, for example, a quay crane 20 for transferring the containers between a bomb cart 24 driven by a UTR truck 26 and a container ship. The control module initiates an operational process 118 on the optical characteristic system to generate an operational result 120.

The management circuit 200 with the second processor 210 may be configured to initiate 204 at least one operational process 118 by the second optical characteristic system 50 to further create the operational result 120 received by the second processor.

The server interface 300 with the third processor 310 may be configured to communication 302 with at least two optical characteristic systems 50 to receive at least the image 52 of the container code 12 of the container 10 being transferred by the container handler 2, for each of the optical characteristic systems. The server interface may further receive and/or generate a container code estimate based upon the image. The third processor may be second communicatively coupled 304 to a container inventory management system 80 and configured to send the container code estimate 54 to the container inventory management system, possibly in the form of a message 230. The message may be compliant with a wireline network protocol and/or a wireless network protocol. The server may also host unreadable container images to one or more audit clients that allows for bad quality container images to be corrected by a human via a computer console and keyboard that displays unreadable images and may be hosted by Server Interface 300.

The second optical characteristic system 50 may be mounted on a second container handler 2 that may be a Rubber Tire Gantry (RTG) 22 crane transferring containers between a bomb cart 24 and one or more stacks 48 of containers 10. The optical characteristic system may further generate a positional identification 64 of the transfer operation, possibly identifying the container as loaded on the bomb cart or placed at a specific height in an identified stack.

Various embodiments of the second optical characteristic system may be configured to capture images 52 from containers 10 in a truck lane, preferably on a bomb cart 24 pulled by a UTR truck 26. The container handler may transfer containers between the bomb carts and one or more stacks 48.

Figure 2:
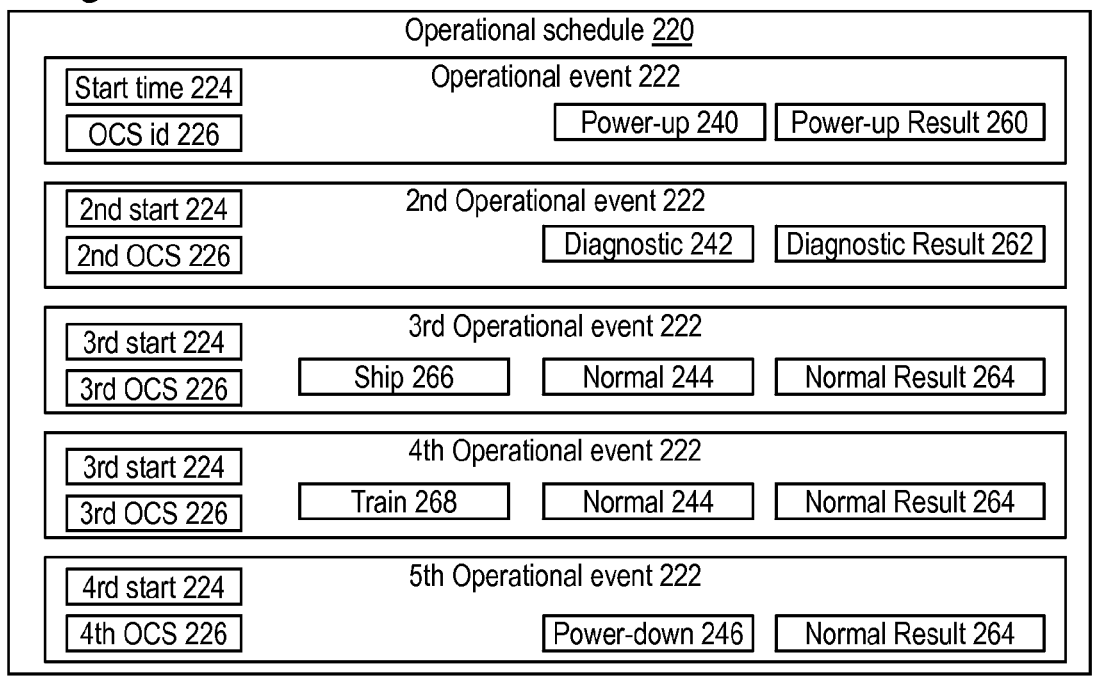
FIG. 2 shows some details of the operational schedule of FIG. 1 including operational events with operational processes such as a power-up process, a diagnostic process, a normal process, and/or a power-down process that may be performed for or near specified ships and/or trains to be serviced by container handler 2.

As used herein, the operational processes may include but are not limited to a power-up process, a power-down process FIG. 2 shows an example of some of the details of the operational schedule 220 of FIG. 1, including multiple operational events 222, each including a start time 224, a list of identified optical characteristic systems 226, an operational process, and its operational result. The operational process may be a member of the group consisting of a power-up process 240, a diagnostic process 242, a normal process 244 and a power-down process 246. Some of the operational entries may further refer to a specific ship 266 and/or a specific train 268 that may involve a specified bill of lading possibly with specific instructions for the loading and/or unloading of containers 10. Note that the operational schedule may include at least one operational event. In the situation where the operational schedule includes exactly one operational event, the situation will refer to standalone or manually directed operation.

Figure 3:
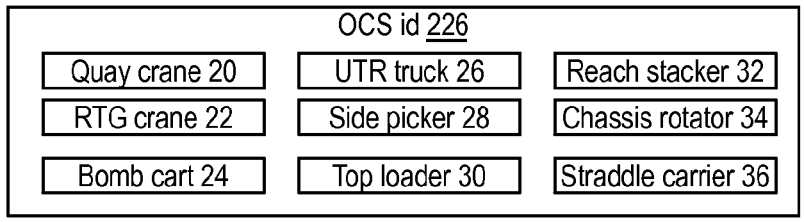
FIG. 3 shows some examples of various kinds of container handlers of FIG. 1.

FIG. 3 shows an example of the list of identified optical characteristic systems 226 of FIG. 2A, identifying at least one of the optical characteristic systems 50 as mounted on a container handler 2, which may include, but is not limited to, one or more the following: a quay crane 20, a Rubber Tire Gantry (RTG) crane 22, a bomb cart 24, a UTR truck 26, a side picker 28, a top loader 30, a reach stacker 32, a chassis rotator 34, and a straddle carrier 36.

By way of example, the operational schedule 220 may include a first power-up event 222 for quay cranes 20 and rubber tire gantry cranes 22 used to initiate the power-up process for their optical characteristic systems 50. The operational schedule may include a second power-up event for the UTR trucks 26 as a second start time 224, because they may take a different length of time to power-up. Note that the operational events may further identify specific instances of the container handlers 2.

Figure 4:
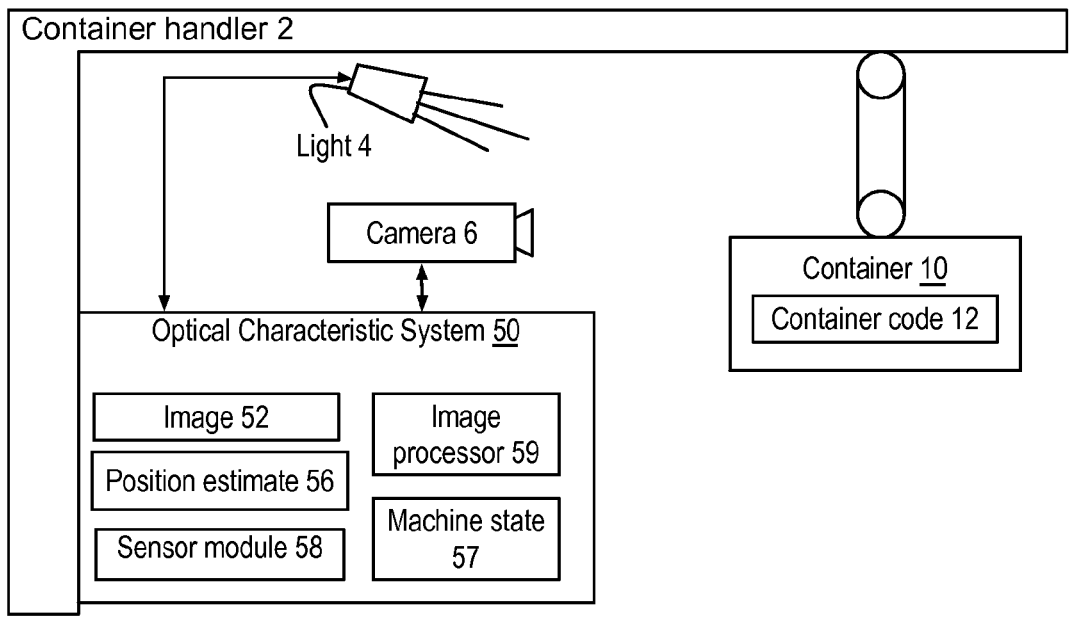
FIG. 4 shows some further components of the container handler and optical characteristic system for which specific operational processes may be initiated, including a sensor interface to the container handler creating at least one machine state.

FIG. 4 shows some details of the optical characteristic system 50 mounted on the container handler 2, including at least one light 4 and at least one camera 6, both may preferably be coupled to the optical characteristic system. The optical characteristic system may preferably include the image 52 received from the camera, a sensor module 58 coupled to the container handler to create a machine state 57 that may indicate a position estimate 56 of the container 10, and an image processor 59. The position estimate may be used to direct the camera and/or the lights to improve the quality of the image. An operational process may be initiated on at least one of the optical characteristic system, the light, the camera, the sensor module and the image processor.

The image processor 59 may receive the image 52 as a raw version of the image to create a filtered version, a compressed version, and/or an enhanced version of the image. The filtered version may remove or attenuate certain frequency bands of the raw version. The compressed version may require smaller storage capacity than the raw version. And the enhanced version may enhance contrast and/or strengthen edges detected in the raw version.

Figure 5:
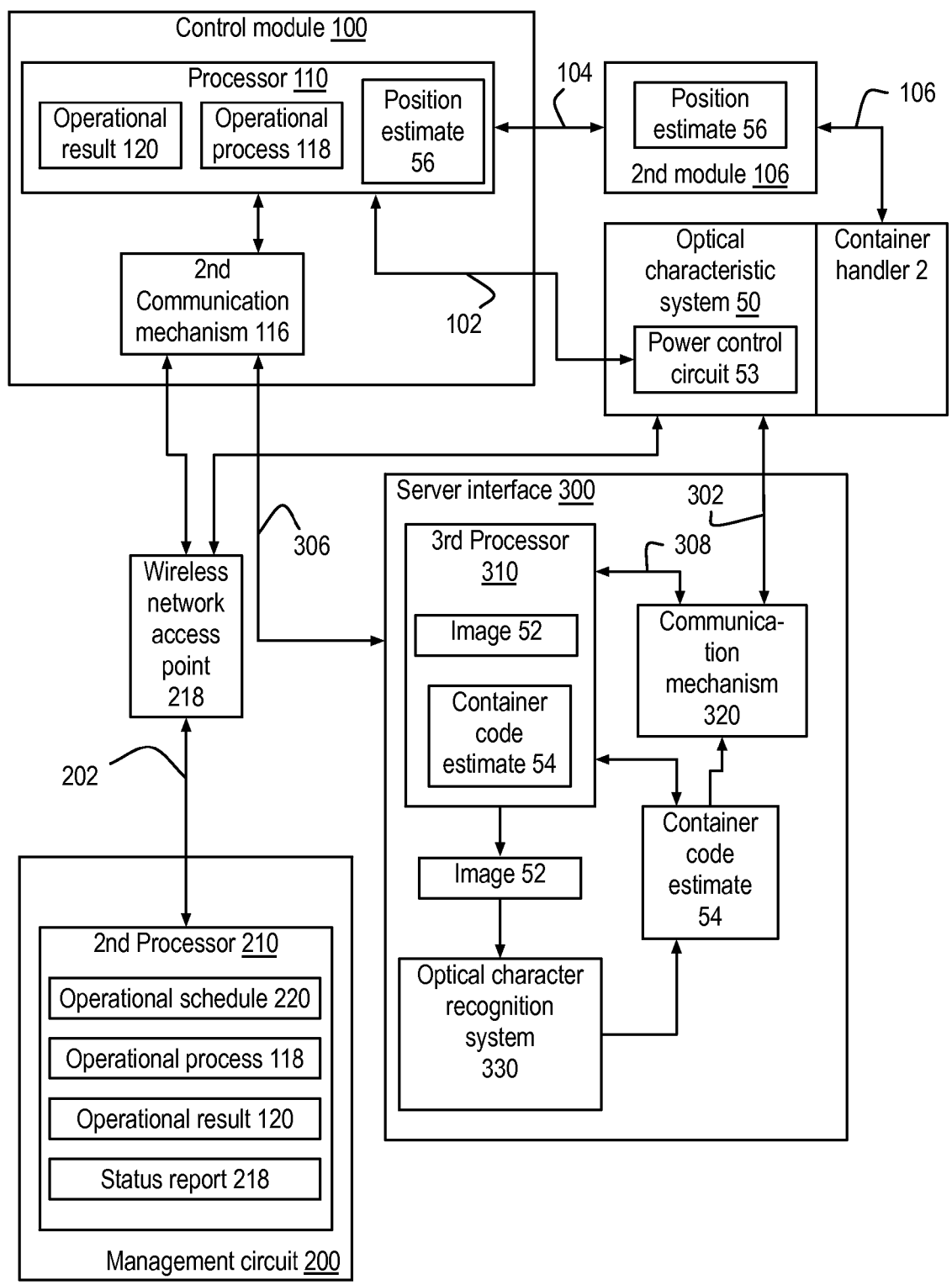
FIG. 5 shows some further details of the embodiments of FIG. 1 including communication mechanisms in the control module and/or the server interface, a wireless network access point, an optical character recognition system in the server interface and the management circuit including a status report assembled from at least some of the operational results. These embodiments may not include optical character recognition capabilities mounted on at least one of the container handlers.

FIG. 5 shows some further details of the embodiments of FIG. 1. A communication mechanism 116 is included in the control module 100 and/or a second communication mechanism 320 in the server interface 300. The control module may further communicatively couple with a power control circuit 53 for the optical characteristic system 50. By way of example, the power control circuit may have a separate uninterruptible power supply and control the power up sequencing based on the running state of the container handler and its equipment, for example, of the communication mechanisms 116 and optical characteristic system the second module 106. A wireless network access point 218 may be communicatively coupled to the control circuit 100, the optical characteristic system, the management circuit 200, and/or the server interface. The server interface may include an optical character recognition system 330 receiving a version of the image 52 to create a container code estimate 54. The management circuit may include a status report 218 assembled from at least some of the operational results 120 and/or the status report may be accessed to update the operational schedule 220. The operational results may indicate successful complete of operational processes and/or may indicate process exceptions such as incomplete performance of the operational process, communication failures, error coding exceptions, power failures and/or power fluctuations.

The control module 100 is further shown with the processor 110 second communicatively coupled 104 with a second module 106 configured to communicate with the container handler 2 to create a position estimate 56 that may be used to refine control of the cameras 6 and/or lights 4 and/or determine the appropriate container position based upon the container position estimate to capture the image 52 by the cameras 6 and lights 4 of FIG. 4.

Any of the operations of the control module 100, the management circuit 200 and/or the server interface 300 may uses a network protocol that complies with at least one member of the group consisting of: a wireless network protocol standard and a wireline network protocol, a time divisional multiple access protocol, a spread spectrum protocol, a packet transfer protocol, a frame transfer protocol, an error correction coding protocol and an encryption protocol.

The wireline network protocol, may further include at least one of the following: a Synchronous Serial Interface protocol, an Ethernet protocol, a Serial Peripheral Interface protocol, an RS-232 protocol, and Inter-IC protocol (sometimes abbreviated as I2C), a Universal Serial Bus (USB) protocol, a Controller Area Network (CAN) protocol, a firewire protocol, which may include implementations of a version of the IEEE 1394 protocol, an RS-485 protocol and/or an RS-422 protocol.

Any of the control module 100, the management circuit 200 and/or the server interface 300 may include a radio frequency tag terminal and/or a radio frequency transmitter and receiver compliant with at least one wireless signaling convention that may implement at least one of a Time Division Multiple Access (TDMA) scheme, a Frequency Division Multiple Access (FDMA) scheme, and/or a spread spectrum scheme, such as:
  examples of the TDMA scheme may include the GSM access scheme;
  examples of the FDMA scheme may include the AMPs scheme;
  the spread spectrum scheme may use at least one of a Code Division Multiple Access (CDMA) scheme, a Frequency Hopping Multiple Access (FHMA) scheme, a Time Hopping Multiple Access (THMA) scheme and an Orthogonal Frequency Division Multiple Access (OFDM) scheme;

examples of the CDMA scheme may include, but are not limited to, an IS-95 access scheme and/or a Wideband CDMA (W-CDMA) access scheme;

examples of the OFDM scheme may include, but are not limited to, a version of the IEEE 802.11 access scheme; and another example of a spread spectrum scheme is the ANSI 371.1 scheme for radio frequency identification and/or location tags.

Figure 6:
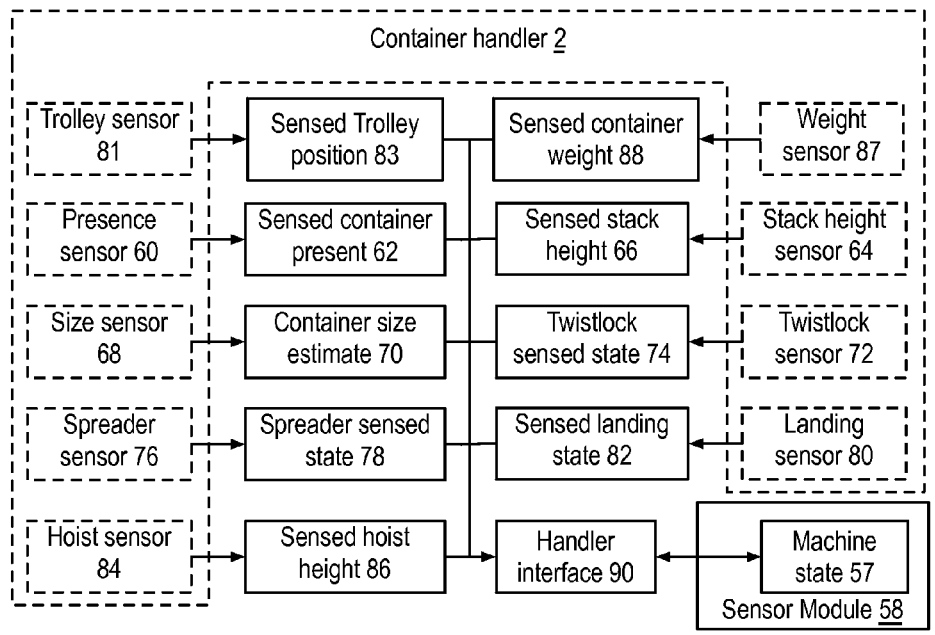
FIG. 6 shows some further details of the sensor module and the machine state of FIG. 4. A stack height 66 may be calculated from sensed stack height 66 or by other means.

FIG. 6 shows some further details of the sensor module 58 and the machine state 57 of the container handler 2 of FIG. 4. A presence sensor 60 may respond to the presence of a container 10 to create a sensed container present 62. A stack height sensor 64 may create a sensed stack height 66. A size sensor 68 may respond to the container being handled to create a container size estimate 70. A twistlock sensor 72 may create a twistlock sensed state 74. A spreader sensor 76 may create a spreader sensed state 78. A landing sensor 80 may create a sensed landing state 82. A trolley sensor 81 may create a sensed trolley position 83. A weight sensor 87 may create a sensed container weight 88. And/or a hoist sensor 84 may create a sensed hoist state 86. Any or all of the sensed states 62, 66, 70, 74, 78, 82, 83, 86, 88 and/or 90 may be included in the machine state. The sensor module may further communicate with a handler interface 90 to create the machine state.

The handler interface 90 may vary for different container handlers 2. For example when the container handler is a quay crane 20 or an RTG crane 22, the container handler may include a Programmable Logic Controller (PLC) Interface coupled via a wireline protocol to get crane spreader interface status and position, and may further, possibly separately couple sensors to a crane hoist and trolley drum for estimates of the spreader vertical and horizontal position relative to dock and/or a sensor for determining the hoist and trolley position, for instance by using a tachometer signal from the trolley and hoist motors, proximity switches, optical encoders, and/or a laser beam. Also, the handler interface may include a wireline network interface to at least one of the sensors of the container handler. Any of these interface approaches may provide sensor reading of a hoist position. As used herein, a wireline network interface may implement an interface to at least one of the wireline network protocols mentioned herein.

Another example, when the container handler 2 is a side picker 28, a top loader 30, a straddle carrier 36 or a reach stacker 32, the handler interface 90 may include a wireline network interface to at least one of the sensors of the container handler. Other sensors may be accessible to the handler interface through separate wireline network interfaces and/or wireline network couplings.

A third example, when the container handler 2 is a UTR truck 26 or a bomb cart 24, the handler interface 90 may include a wireline network interface to at least one, and possibly all the accessed sensors of the container handler. Alternatively, more than one wireline network interfaces and/or wireline network couplings may be used.

The handler interface 90 may further receive any or all of the following information that may be forwarded to the container management system 80: the location of the container 10, a sensed operator identity of the operator operating the container handler 2, a container radio frequency tag, a container weight, a container damage estimate, an indication of the container handler moving in a reverse motion, a frequent stops count, a fuel level estimate, a compass reading, a collision state, a wind speed estimate, a vehicle speed, and an estimate of the state of a vehicle braking system.

The handler interface 90 may include a second radio transceiver providing a radio frequency tag interface capable of locating the container handler 2 and/or identifying the container 10 and/or its container code 12.

The handler interface 90 may include a third radio transceiver using a Global Positioning System and/or a Differential Global Position System to determine the location of the container 2.

The handler interface 90 may include an interface to a short range and/or low power sonar, radar, and/or laser that may provide a position estimate 56 of the container 10. The radar may preferably be non-toxic for humans and possibly livestock and other animals in or near the containers.

Figure 7:
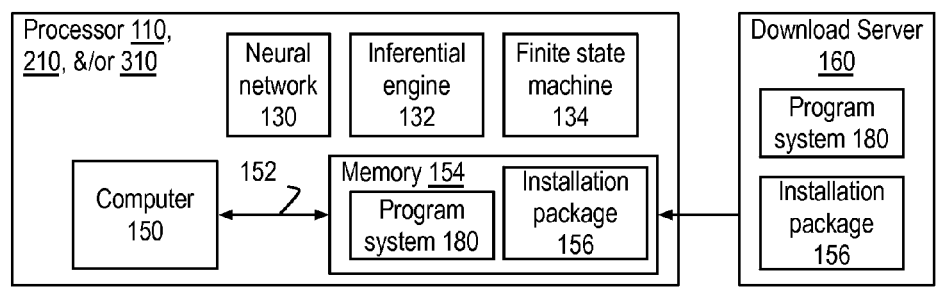
FIG. 7 shows that any processor as used herein may include at least one instance of at least one of a neural network, an inferential engine, a finite state machine, and a computer directed by a program system. The program system may reside in a computer readable memory and/or an installation package, and/or a download server. The computer readable memory may be accessibly coupled to the computer as shown, or may not be accessibly coupled, which is not shown.

FIG. 7 shows that any processor 110, 210, and/or 310 as used herein may include at least one instance of at least one of a neural network 130, an inferential engine 132, a finite state machine 134, and a computer 150 directed by a program system 180. The program system may reside in a computer readable memory 154 and/or an installation package 156, and/or a download server 160. The computer readable memory may be accessibly coupled 152 to the computer as shown, or may not be accessibly coupled, which is not shown.

As used herein, a neural network 130 maintains a collection of neurons and a collection of synaptic connections between the neurons. Neural networks are stimulated at their neurons leading through their synaptic connections to the firing of other neurons. Examples of neural networks include but are not limited to aromatic chemical compound detectors used to detect the presence of bombs and drugs.

As used herein, an inferential engine 132 maintains a collection of inference rules and a fact database and responds to queries and assertions by invoking rules and accessing the fact database. Examples of inferential engines include fuzzy logic controllers and constraint based decision engines used to determine paths through networks based upon the network constraints, such as the current location of parked and moving vehicles and available storage locations for containers.

As used herein, a finite state machine 134 receives at least one input, maintains and updates at least one state and generates at least one output based upon the value of at least one of the inputs and/or the value of at least one of the states.

As used herein, a computer 150 includes at least one data processor and at least one instruction processor instructed by the program system 180, where each of the data processors is instructed by at least one of the instruction processors.

Some of the following figures show flowcharts of at least one embodiment of at least one of the methods of the invention, which may include arrows signifying a flow of control, and sometimes data, supporting various implementations.

The boxes denote steps or program steps of at least one of the invention's methods and may further denote at least one dominant response in a neural network 130, and/or at least one state transition of the finite state machine 134, and/or at least one inferential link in the inferential engine 132, and/or a program step, or operation, or program thread, executing upon the computer 150.

Each of these steps may at least partly support the operation to be performed as part of a means for an operation or use. Other circuitry such as network interfaces, radio transmitters, radio receivers, specialized encoders and/or decoders, sensors, memory management and so on may also be involved in performing the operation further providing the means for the operation.

The operation of starting in a flowchart is denoted by a rounded box with the word "Start" in it and may refer to at least one of the following: entering a subroutine or a macro instruction sequence in the computer 150, and/or of directing a state transition of the finite state machine 134, possibly pushing of a return state, and/or entering a deeper node of the inferential engine 132 and/or stimulating a list of neurons in the neural network 130.

The operation of termination in a flowchart is denoted by a rounded box with the word "Exit" in it and may refer to completion of those operations, which may result in at least one of the following: a return to dormancy of the firing of the neurons in the neural network 130, and/or traversal to a higher node in the graph of the fact database and/or the rules collection in the inferential engine 132, and/or possibly return to a previously pushed state in the finite state machine 134, and/or in a subroutine return in the computer 150.

Figure 8:
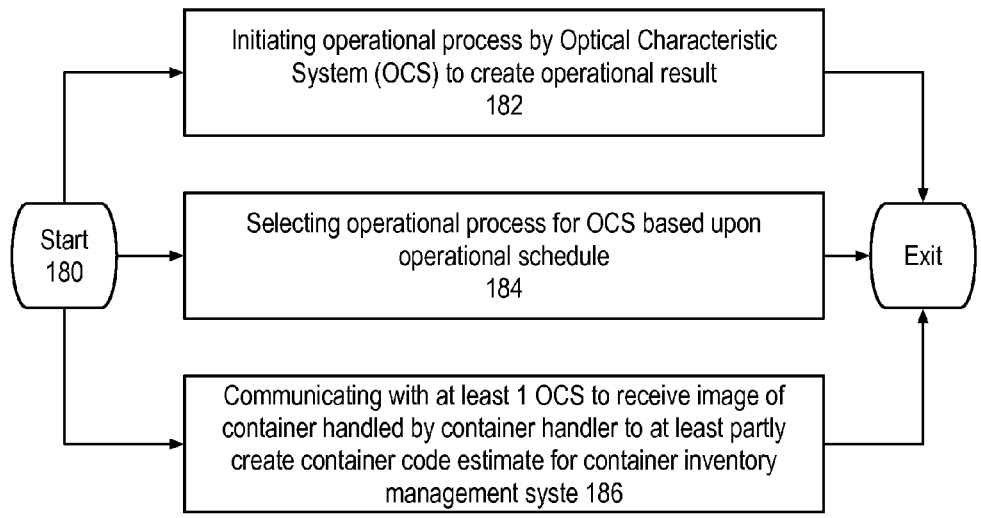
FIG. 8 shows a flowchart of the program system of FIG. 7 as including at least one of the program steps of initiating the operational process by the optical characteristic system to create the operational result, selecting the operational process based upon the operational schedule, and/or communicating with at least one optical characteristic system to receive at least one image of the container being handled by the container handler to at least partly create the container code estimate for transmission to the container inventory management system.

FIG. 8 shows a flowchart of the program system 180 of FIG. 7 as including at least one of the following program steps: Program step 182 supports initiating the operational process 118 by the optical characteristic system 50 to create the operational result 120. Program step 184 support selecting the operational process based upon the operational schedule 220. And program step 186 supports communicating with at least one optical characteristic system to receive a version of at least one image 52 of the container 10 being handled by the container handler 2 to at least partly create the container code estimate 54 of its container code 12 for transmission 304 to the container inventory management system 80.

Figure 9:
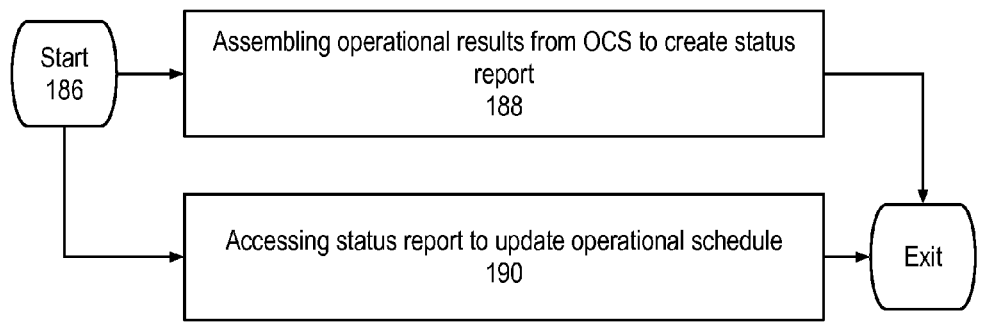
FIG. 9 shows a flowchart of some further details of selecting the operational process, including assembling at least some of the operational results from the optical characteristic systems to create the status report and/or accessing the status report to update the operation schedule.

FIG. 9 shows a flowchart of some further details of program step 186 further selecting the operational process 118, including at least one of the following program steps: Program step 188 supports assembling at least some of the operational results 120 from the optical characteristic systems 50 to create the status report 218. Program step 190 supports accessing the status report to update the operation schedule 220.

FIGS. 10A and 10B show some images of the container code as displayed on various sides of the container. And FIG. 10C shows a container code estimate derived from one of these images.

The preceding embodiments provide examples of the invention, and are not meant to constrain the scope of the following claims.

What is claimed is:

1. An apparatus, comprising:
   an optical characteristic system configured to mount on a container handler;
   a control module configured to initiate an operational process by said optical characteristic system to create an operational result;
   a processor configured to select said operational process based upon an operational schedule, said processor configured to communicate with said optical characteristic system to receive said operational result;
   a server interface configured to communicate with said optical characteristic system to receive an image of a container being handled by said container handler to create an estimate of a container code on an exterior of said container, said server interface configured to transmit said estimate of a container code to a container inventory management system, and said server interface and said processor configured to communicate by a wireless network.

2. The apparatus of claim 1, wherein said operational process is initiated on at least one member of the group consisting of: a power-up process, a diagnostic process, at least one normal process, and a power-down process.

3. The apparatus of claim 1, wherein said container handler comprises at least one member of the group consisting of a UTR truck, a bomb cart, a chassis rotator, a quay crane, a side picker, a top loader, a straddle carrier, a reach stacker, and a Rubber Tire Gantry crane.

4. The apparatus of claim 1, wherein said operational process is performed on at least one member of a group consisting of: said optical characteristic system, a camera, a light, a sensor module adapted to create a machine state of said container handler, and an image processor adapted to generate said container code estimate based upon said image.

5. The apparatus of claim 1, further comprising a second module adapted to provide a position estimate of a container being handled by said container handler, said second module communicatively coupled to said processor.

6. The apparatus of claim 1, wherein said processor is configured to initiate said operational process; and said operational schedule includes at least one operational event.

7. The apparatus of claim 1, wherein said processor is configured to read a portable memory device adapted to store said image of said container being handled said container handler.

8. An apparatus, comprising:
   an optical characteristic system configured to mount on a container handler;
   a control module;
   an operational process initiated by said control module;
   an operational result created by said operational process;
   a processor in communication with said optical characteristic system, said processor configured to select said operational process;
   a wireless network;
   a server interface in communication with said optical characteristic system, said server interface in communication with said processor by said wireless network;
   an image of a container from said optical characteristic system; and
   an estimate of a container code created by said server interface from said image.

* * * * *